Sept. 5, 1972     C. C. PHILLIPS     3,689,318
APPARATUS AND METHOD FOR WASHING TRAILER INTERIORS
Filed March 17, 1971     3 Sheets-Sheet 1
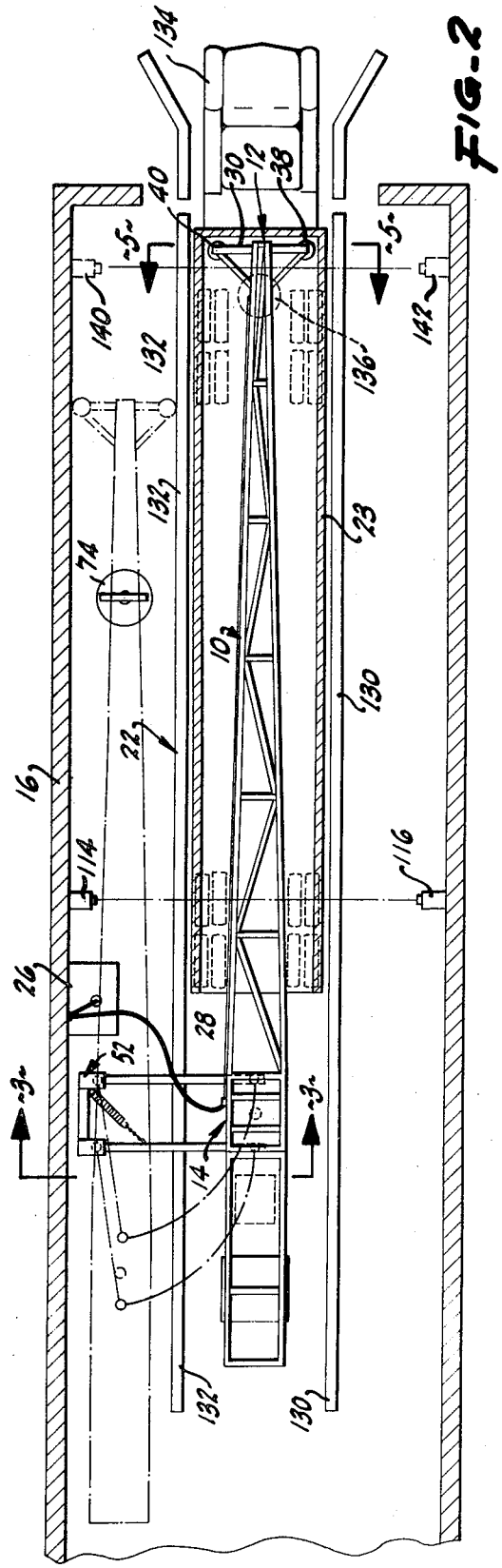
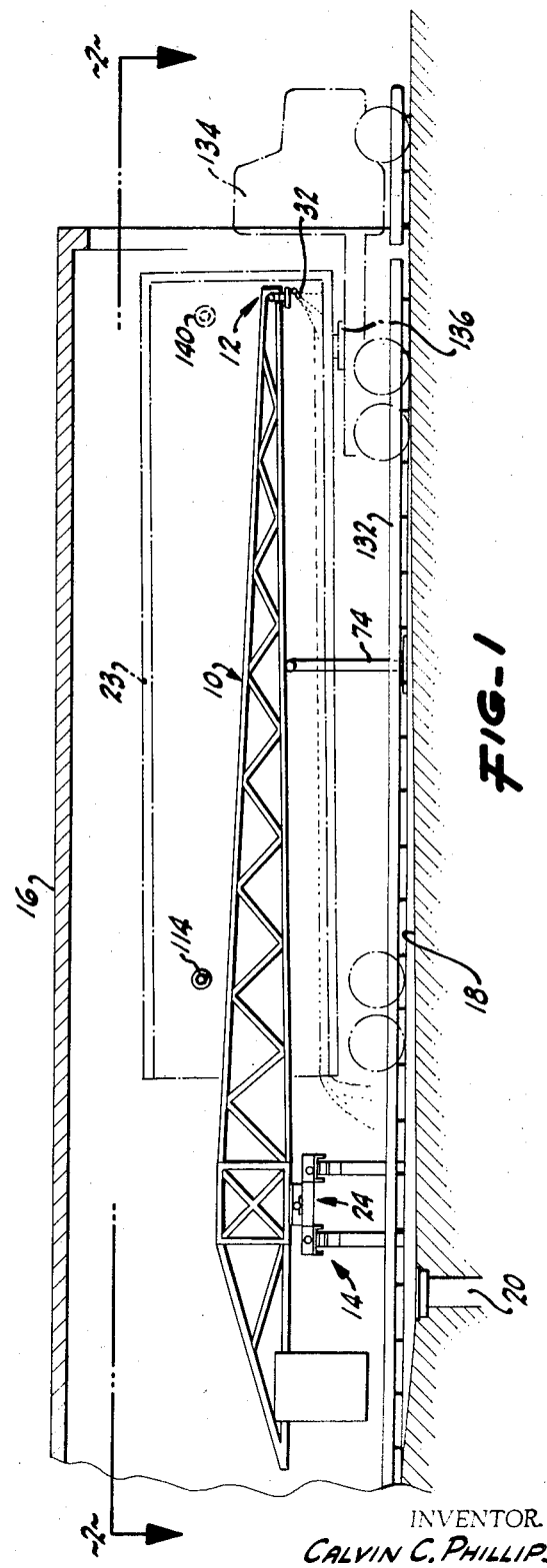
INVENTOR.
CALVIN C. PHILLIPS
BY
Flehr, Hohbach, Test,
Albritton & Herbert
ATTORNEYS

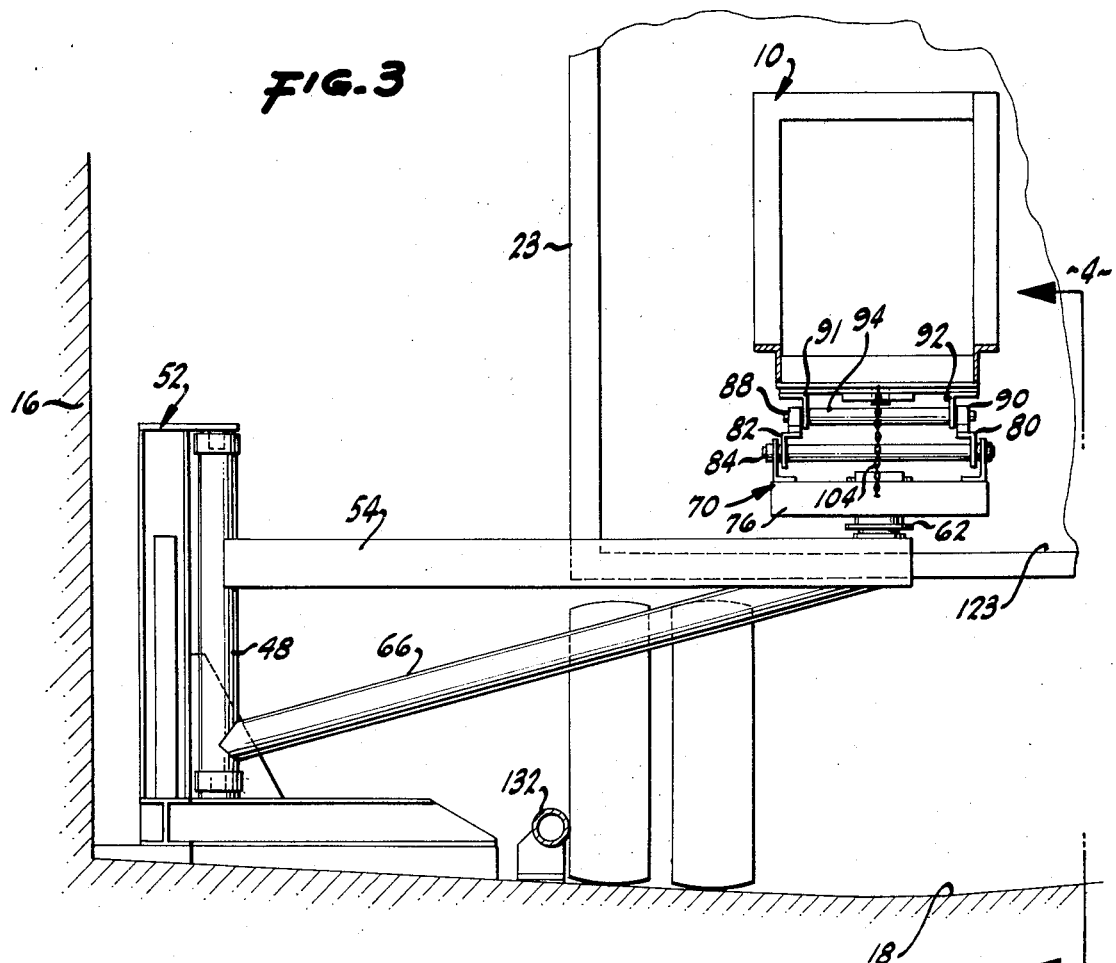
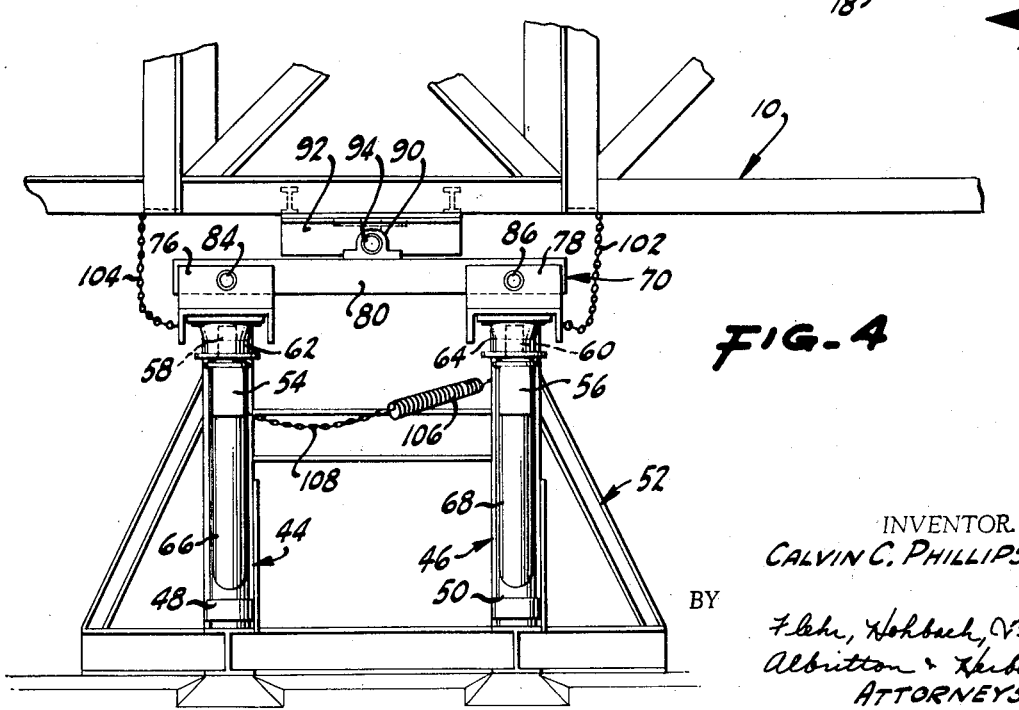

INVENTOR.
CALVIN C. PHILLIPS
BY
Flehr, Hohbach, Rest,
Albritton & Herbert
ATTORNEYS United States Patent Office 3,689,318
Patented Sept. 5, 1972

3,689,318
APPARATUS AND METHOD FOR WASHING
TRAILER INTERIORS
Calvin C. Phillips, Denver, Colo., assignor to Safeway
Stores, Incorporated, Oakland, Calif.
Filed Mar. 17, 1971, Ser. No. 125,118
Int. Cl. B08b 9/08
U.S. Cl. 134—23
16 Claims

ABSTRACT OF THE DISCLOSURE

Apparatus and method for washing trailer interiors using a horizontal boom carrying a washing head at its free end. A driver backs the trailer to be washed onto the boom so that the boom structure extends through the rear opening and into the trailer until the washing head is proximate the front of the trailer. Means are provided for sensing this condition and for starting a wash cycle in which the washing head provides a spray having a pattern extending laterally across the entire width of the interior of the trailer. The driver then slowly pulls forward and as the head delivers the spray, the same is swept along the trailer floor toward the rear thereof to clean the trailer.

BACKGROUND OF THE INVENTION

This invention relates to the washing of truck or trailer body interiors and more particularly to the method and apparatus by which the interior is automatically washed out by having the driver back the trailer into the apparatus and then drive forward at a slow rate. As used herein, the term trailer body or simply trailer will be used to denote any type of wheeled vehicle body for use on roads and includes truck bodies, trailer bodies and the like.

Heretofore, it has been known to wash trailer interiors from fixed position washing nozzles. It is also known to use a moving washer which travels forward and backward in the trailer while spraying a suitable washing fluid to rinse out the trailer. Such systems have numerous limitations and disadvantages. Fixed position equipment fails to be fully effective over the entire region to be cleaned while movable equipment that is self-propelled to travel back and forth in the trailer body is complicated and time consuming to set up, expensive to build and maintain and requires an operator. There is therefore a need for a new and improved method and apparatus for washing trailer interiors.

SUMMARY OF THE INVENTION AND OBJECTS

A general object of the present invention is to provide a method and apparatus for washing trailer interiors which will overcome the above disadvantages and limitations in which the washing head of the apparatus is caused to be moved relative to the trailer interior by backing the trailer into the apparatus to bring the washing head to a front interior position within the trailer body and then driving the trailer slowly forward and away from the apparatus during the washing cycle, the driver never getting out of the cab.

Another object of the invention is to provide a method and apparatus for washing trailers of the above character which is completely automatic requiring only that the driver back the trailer into the apparatus and then drive off slowly.

Another object of the invention is to provide a method and apparatus of the above character which is substantially stationary but which can be in operation and which can be retracted out of the way to permit alternate uses of the location of its installation.

Another object of the invention is to provide a method and apparatus for washing trailers of the above character which is substantially stationary so that ample water and drainage facilities can be utilized for trailer washing.

The foregoing objects are achieved in the present invention by providing an elongate boom structure mounted in a substantially horizontal position and having a free end set in an elevation that a trailer body can be backed into the boom structure. The boom structure is sufficiently long to extend through the rear opening of the trailer and substantially the entire length of its interior. The free end of the boom carries a washing head having spray forming means providing a generally downwardly directed spray pattern extending laterally across substantially the entire width of the interior of the trailer, and is connected to a source of washing liquid. Switching means is provided for controlling the flow of washing liquid to the washing head and operates to sense when the trailer is backed into the boom structure. The washing action can be begun either to start washing as soon as the boom enters the trailer and to stop when it is retracted by the movement of the trailer so that washing occurs both as the head traverses the trailer going in and coming out. Alternatively, the switching circuit can be set to start the wash cycle after the boom is proximate the front wall of the trailer.

In one preferred form of the invention, the boom is provided with a counterweight and supported by a four bar linkage so that is can be swung out of the way to permit alternate use of the facilities. Also, the linkage is provided with means for permitting limited vertical motion of the free end of the boom but restrains the boom from lateral motion. It also provides for limited retractive motion in case the trailer is backed too far toward the boom.

Washing of the interior of a trailer is exceedingly simple and requires only that the trailer be backed into the boom until the washing head enters the interior and is located proximate the interior front of the trailer. The switching means senses this condition and turns on the source of washing fluid to the head. The operator then slowly drives forward and away from the boom so that the washing head and associated spray is traversed from the front to the rear of the trailer body.

BRIEF DESCRIPTION OF THE DRAWINGS

FIG. 1 is a side elevational view of a trailer washing apparatus constructed in accordance with the present invention.

FIG. 2 is a plan view of the trailer washer of FIG. 1 taken along the lines 2—2.

FIG. 3 is an end view from the rear showing the portions of the supporting structure of the trailer washer of FIG. 1 taken along the lines 3—3.

FIG. 4 is an elevational view taken along the lines 4—4 of FIG. 3.

DETAILED DESCRIPTION OF THE PREFERRED EMBODIMENTS

Figure 5:
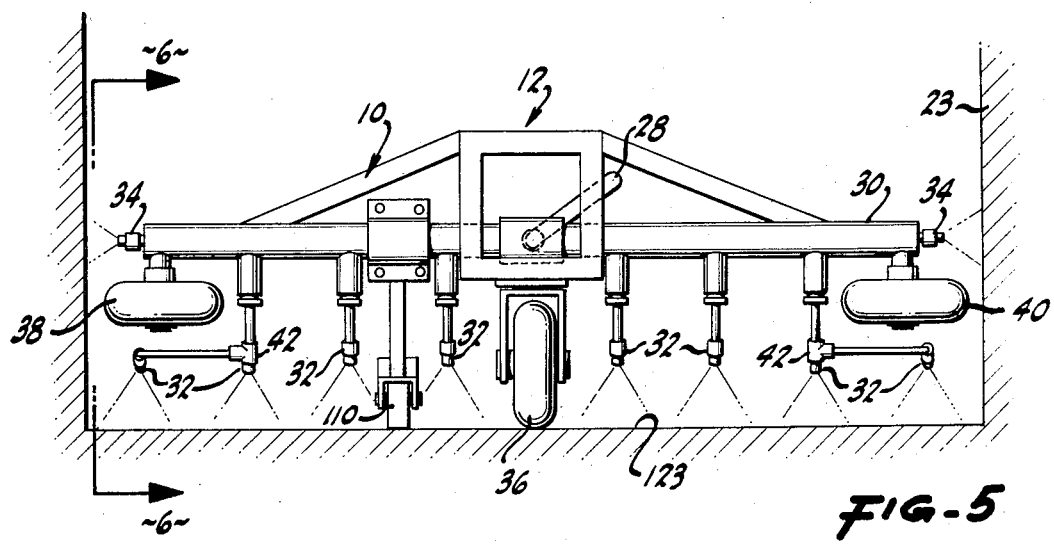
FIG. 5 is a front view of the washing head taken along the lines 5—5 of FIG. 2.

Referring generally to FIGS. 1 and 2 there is shown the apparatus for washing trailers constructed in accordance with the present invention and includes an elongate boom structure 10 having a washing head 12 mounted at its free end and supported on a suitable mounting structure 14 at a substantially fixed location which may, for example, be within the interior of a trailer washing house 16 or suitable garage having a floor 18 which slopes downwardly to a drain 20 located near the support mounting 14. As is apparent, the slope of the floor is assumed by the trailer when the same is positioned in a washing position to thereby aid the flow of water and debris out of the trailer as the same is being washed; and, the slope also provides for adequate flow of drainage dumped on the floor of the building during the washing operation. Means 22 are provided in alignment with the elongate boom for providing a guide to the driver in backing a trailer 23 into an aligned path with the boom.

More particularly, the boom structure consists of a trussed framework fabricated of structural steel parts and is box-like in cross section and gradually tapering down to smaller sections at its remote end. A plurality of internally mounted cross braces and trusses are used to give the boom adequate rigidity. The boom extends to a remote point at its free end over a length adequate to reach to the front of the trailers to be washed. Typically such trailers have an interior extent of about 45 feet and the boom should be slightly longer than the length of the trailer. The other end of the boom extends a shorter distance and terminates in a box-like structure which depends from the boom framework and serves to carry a counterbalancing weight to thereby define a balance point of the boom indicated at 24 to permit the boom to be supported in a free standing, generally horizontal position.

A source of washing liquid, usually water or some continuation of water steam, or detergent under pressure is provided and consists of a suitable pump 26 and controlled by suitable circuitry to be explained hereinafter. The output of the pump is taken through a hose 28 run along the boom structure to the free end thereof and connects to washing head 12.

Figure 6:
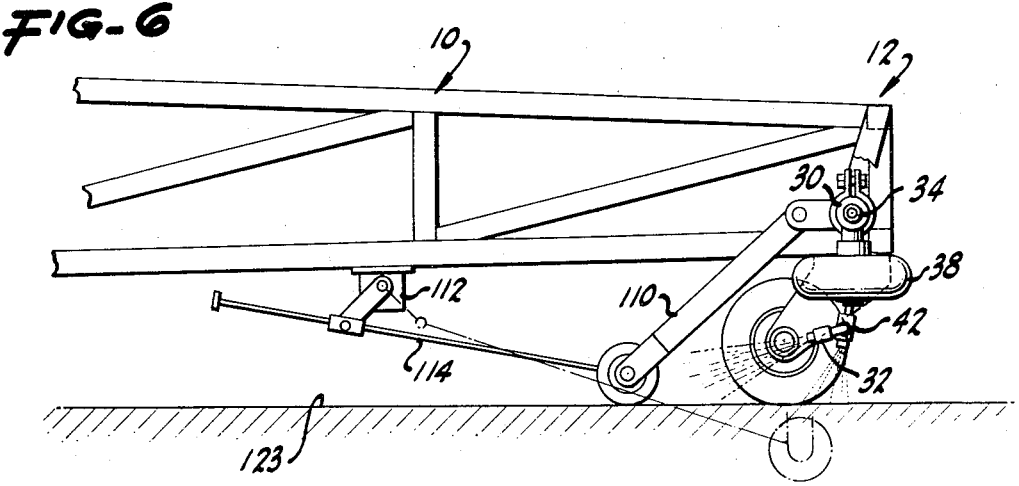
FIG. 6 is a side elevational view of the washing head taken along the lines 6—6 of FIG. 5.

Referring now more particularly to FIGS. 5 and 6 the washing head 12 of the present invention is shown in greater detail and includes a header pipe 30 laterally extending tranversely of the boom substantially the entire extent of the trailer interior. The distribution head supports and connects to a plurality of generally downwardly pointed nozzles 32 substantially equally spaced along its extent which serve to develop a spray pattern which extends laterally across the width of the interior of the trailer. Side extending nozzles 34 are connected at the end of the distribution head for washing the adjacent side wall and for providing additional run-off at the edges of the trailer interior. As used herein, generally downwardly is meant to include not only a downward direction but a reasonable range of directions that the nozzles could be pointed in between downward and rearward, as for example is indicated in FIG. 1.

Means are provided for supporting the washing head so that the nozzles are positioned at a predetermined distance above the trailer floor and includes a caster mounted resilient wheel 36 mounted in the middle of the head. Bumper means are provided on each side of the head and consist of a resilient wheel 38, 40 mounted for rotation on a horizontal plane and projecting laterally beyond the front of the washing head and beyond each side thereof to prevent contact of the head and damage to the trailer walls. In order to extend into the region beneath each of the side bumper, each side nozzle is operated from a T 42 off of the adjacent nozzle at each side of the unit as substantially shown in FIG. 5.

Preferably the nozzles are directed or canted slightly rearwardly to provide additional momentum in a rearward direction and thereby promote sweeping and flowing action of the spray pattern as the same is drawn rearwardly to the trailer. Although not critical, it was found that in one application 56° Binks spray nozzles, 10 in number, operated at 100 lbs./in.² were quite effective in providing the necessary spraying force and required an input of 3.3 gallons per minute from the pump.

Referring now more particularly to FIGS. 3 and 4 there is shown the means for mounting the boom structure in substantially horizontal position and so constructed and arranged to permit limited vertical movement of the head and limited retractive motion rearwardly, but constrained to limit lateral motion of the boom in a direction perpendicular to the direction in which it extends. Such means includes a pair of support booms 44, 46 having vertical members 48, 50 mounted for rotation in a support frame 52 secured to the building or other suitable structure. Each of the booms 44, 46 further includes a horizontal member 54, 56 the outer end of which terminates and supports spindles 58, 60 for carrying a bull wheel or hub 62, 64. Guys 66, 68 extend between the lower end of the vertical members and the outer end of the horizontal members to provide adequate support. A frame 70 is carried on the hubs 62, 64 and is so dimensioned as to cause said support booms 44, 46 and frame 70 a parallel, four-bar linkage of which the support booms form cranks to support frame 70 as a floating link. Since the booms are of equal length and mounted on a line of centers at the support frame 52 having a separation equal to the frame 70 parallel crank four-bar linkage is formed having the property that frame 70 is always parallel to the trailer. Furthermore, the entire assembly together with the washing boom carried thereon can be swung rearwardly, for example, and up to the wall as indicated in FIG. 2 where it is out of the way and permits the use of the structure or area for other purposes. A suitable stand 74 may be provided for supporting the free end of the boom when it is swung up against the wall. (FIGS. 1 and 2.)

The frame 70 includes transverse members 76, 78 and is supported on hubs 62, 64 and carry rails 80, 82 set on shafts 84, 86 and in alignment with the elongate boom 10 and serving together with said transverse members 76, 78 and shaft 84, 86 to form frame.

Means are provided for pivotably mounting the elongate boom 10 and consist of a pair of pillow blocks 88, 90 mounted on the rails and aligned along an axis perpendicular the length of the boom 10. The boom carries downwardly extending angle iron members 91, 92 arranged to receive a shaft 94 and which is set in the pillow blocks. The angle members are so arranged that they support the shaft 94 from a position interiorially between the pillow blocks to prevent lateral movement of the boom structure. Although alternate means could be used to interconnect the transverse members 76, 78 with the rails, shafts were chosen to facilitate assembly, disassembly and to relieve stresses which would exist in a more rigid structure.

Means are provided for limiting the motion of the boom in a vertical direction and consists of chains 102, 104 (FIG. 4) which are attached between each of the support booms and respective adjacent portion of the elongate boom 10. Additionally, when in service, it is desired to have means for yieldably urging the elongate boom towards the trailer and for providing a capability for retractive motion in case the trailer is backed too far into the spray head. Such means consists of a spring 106 connected by a chain 108 between the support frame and an intermediate position along the length of the rearmost support boom 44. Since the linkage formed by the frame and support booms is at a fully extended position during operation, the rearward retractive movement of the unit does not cause the material lateral displacement until a reasonable range of motion has been exceeded; as, for example, when the unit is retracted out of use.

Means is provided for controlling the flow of the washing liquid to the washing head when the trailer is backed into the boom structure so that after it is fully in and the driver begins to pull away the washing fluid is delivered to the washing head. Such means operate to start flow of the washing liquid when the free end of the boom structure reaches a predetermined position in the interior of the trailer and also serves to stop the flow when the trailer is pulled clear forward of the washing head.

Figure 7:
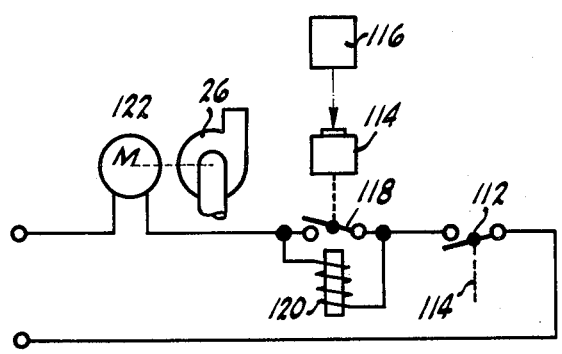
FIG. 7 is a schematic diagram of one form of suitable switching circuitry for automatically controlling the turning on and off of the washing fluid at predetermined position of the boom structure within the interior of the trailer.

Referring particularly to FIGS. 6 and 7 one form of such means can include a dangle wheel 110 mounted for a pivotable movement on the washing head and so arranged that it moves rearwardly in an arcuate path as the boom enters the trailer by contact of the dangle wheel with the trailer floor 123. A switch 112 is mounted on the boom structure and connected to the dangle wheel by a suitable link 114. The switch has open and closed positions and is so arranged that when the dangle wheel is operated by contact with the floor the switch is operated to a closed, conductive position.

The control circuit further includes means for sensing when the rear of the trailer nears a rearmost limit such that the boom 10 extends nearly completely within the trailer 23. Such means can conveniently be formed from a photocell 114 and light 116 mounted to sense the upper rear of the trailer body as shown in FIG. 2 by being positioned transversely of rearward most point of movement of the trailer to thereby intercept the light beam. When the beam is intercepted, a switch 118 in the photocell is activated to a closed position. The photocell switch is bridged with a latching relay 120 which maintains it in a conductive condition as long as power flows in the circuit. Each of the switches 112, 120 is connected in series in the power supply to a motor 122 driving the pump. Thus, as the trailer is backed in the dangle switch is operated immediately but fails to start the washing cycle until the rear of the trailer interrupts the photocell circuit whereupon the washing cycle is started at a predetermined position of the washing head within the trailer. This predetermined position can be adjusted by locating the photocell and associated switch at a suitable position along the walls of the structure. As the trailer backs out the photocell circuit is reestablished due to current flowing to motor 122, the latching means 120 serves to retain the photocell switch in a closed position until the dangle switch 112 opens as the washing head clears the rear of the trailer.

The operation of the device is completely automatic and requires only that the driver back the trailer into alignment with and back into the apparatus and then drive away. Means are associated with the boom and aligned therewith for guiding the driver and trailer into aligned path with the boom. Such means can take various form. One form which absolutely assures that the driver will be aligned includes the provision of pipes 130, 132 mounted along each side of the path the trailer is to take when aligned, the pipes being of a diameter which makes it difficult to jump them by being misaligned. The driver usually is operating a yardgoat 134, which is a tractor retired from normal road service and usually equipped with hydraulically elevatable fifth wheel 136 which permits the raising of the trailer to thereby facilitate moving trailers about the yard without the need for raising the forward support wheels by cranking them up as is common when a trailer is picked up for use on the road. Such yard tractors move incoming trailers and facilitate use with the present invention, as will be explained. Thus, the driver or switcher merely backs the trailer in alignment with the boom structure until the washing head is positioned proximate to the front of the trailer body. Thereafter, the driver merely drives slowly forward and away from the boom and the washing action takes place automatically by the action of the switches 112 and 118. In addition, the yard tractor may be used by the operator to raise the elevation of the front of the trailer with the fifth wheel to promote gravitational flow of debris and washing fluid to the back of the trailer as the same is moved.

Many modifications and adaptations of the present invention will occur to those skilled in the art to which it relates. For example, instead of employing a dangle switch on the end of the boom, similar effect can be obtained by mounting a second photocell circuit at the forward end of the boom as shown in dotted lines at 140, 142, FIG. 2. Also, the structural material of which the boom structure is made could be structural aluminum in place of steel tubing to lower the weight. The washing cycle may be easily altered to suit the requirements as, for example, by utilizing a two-cycle operation in which detergent wash occurs as the vehicle is backed into the apparatus and rinse-out without detergent occurs as the vehicle is driven away, with or without steam. Another modification which might have considerable utility would be to install a brush laterally extending the width of the trailer a couple of feet rearwardly of the washing head. The brush could be suspended in such a manner that it is normally held off the trailer floor until activated during the wash cycle at which time it could be lowered into contact with the floor to then serve as the means for maintaining the nozzles at a predetermined height and thereby relieve the swivel caster, and further serve to aid in removing the large debris from the trailer by direct physical sweeping movement. Accordingly, it is to be understood that the disclosures and descriptions of the present applications are to be taken as an illustration of one form of carrying out the present invention and the structural details disclosed herein are not to be taken in a limiting sense except as set in the accompanying claims.

I claim:

1. Apparatus for washing the interior of a trailer body having a rear opening therein and secured to a tractor, truck or other means for a driver to move the same, comprising an elongate boom structure, means for mounting said boom structure in a substantially horizontal position at a substantially fixed location with one free end of said boom at an elevation such that the trailer body can be moved so that said boom structure extends through the rear opening and into the interior of the trailer body, a source of washing liquid, a washing head carried on the free end of said boom structure and having spray forming means providing a generally downwardly directed spray pattern of said washing liquid, said washing head being constructed and arranged so that said spray pattern extends laterally across substantially the entire width of the interior of the trailer body, means for conveying washing liquid from said source to said washing head, and means for automatically controlling the flow of washing liquid to the washing head in response to said trailer being backed onto and then away from said boom structure so that said body interior is washed by having a driver back the trailer body into alignment and back onto said boom structure until said washing head is positioned proximate the front of said body interior and then slowly driving forward to cause the spraying action to sweep from the forward end of the body to the rearward end thereof at a rate controlled by the movement of said trailer away from the apparatus.

2. Apparatus as in claim 1 in which said boom includes a counterweight, and in which said means for mounting said boom is positioned at the proximate balance point thereof so that the washing head is carried at an elevation slightly higher than the floor of said trailer.

3. Apparatus as in claim 1 in which said means for mounting said boom is constructed and arranged to permit limited vertical movement of said head and limited retractive motion of said head but constrains lateral motion of said boom in a direction perpendicular to the direction to which the boom is extending.

4. Apparatus as in claim 1 in which said mounting means includes at least one support boom mounted for rotation on a vertical axis at one end, a bull wheel carried at the other end of said support boom, a frame carried on said bull wheel and including pivoting mounting means for connecting the frame to the boom, the pivot axis being transverse of the direction in which the boom is extending to permit vertical movement of said washing head.

5. Apparatus as in claim 1 further including a control circuit for turning on said washer when the washing head is located within the trailer, said control circuiting means for sensing whenever the rear of the trailer nears a rearmost limit and for supplying the conductive power path to a source of power for said source of washing fluid, latching means for holding said last named means in conductive condition as long as power is supplied to said source, and second means for supplying a conductive power path connected in series in first means and carried at a position corresponding to the free end of said boom and said washing head whereby as the trailer is backed into the boom the source washing fluid is turned on upon simultaneous conduction of both of said switch means and remains on until the trailer is driven forward and clear of said washing head.

6. Apparatus as in claim 1 further including means associated with said boom and aligned therewith for guiding the driver and trailer onto an aligned path with said boom.

7. Apparatus as in claim 1 wherein said means for controlling the flow of washing fluid includes switch means for starting flow of the washing liquid when the free end of the boom structure reaches a predetermined position in the interior of the trailer body and for stopping the flow when the trailer is pulled clear forward of the washing head.

8. Apparatus as in claim 7 wherein said switch means includes sensing means carried at the free end of said boom structure for being operated by contact with the floor of said trailer and a switch having closed and open positions, means connecting said sensing means to said switch to operate the same into the closed, conductive position.

9. Apparatus as in claim 1 in which said mounting means includes a pair of support booms mounted in a spaced parallel relation for rotation on vertical axes at their one ends, a bull wheel carried on the other end of each of said support booms, a frame carried on said bull wheels and dimensioned such that said support booms move parallel to each other as a four-bar linkage in which said frame serves as a floating link, and pivot mounting means connecting the frame to the boom, the pivot axis being transverse of the direction of which the boom is extended to permit vertical movement of said washing head.

10. Apparatus as in claim 9 in which said pivot means includes a pair of pillow blocks mounted on said frame in general alignment on an axis to define a pivot axis transverse of said boom, means carried on said washing boom for resting on said pillow blocks for pivotable movement therein.

11. Apparatus as in claim 1 in which said washing head includes a distribution header extending transversely of the boom and substantially the width of the interior of the trailer to be washed, a plurality of nozzles mounted on said header and connected to receive washing fluid therefrom, said nozzles being arranged to be directed downwardly to form a spray extending substantially laterally throughout the region of the trailer immediately beneath said head, means for supporting said boom whereby said nozzles are positioned at a predetermined height above the floor of the trailer.

12. Apparatus as in claim 11 further including at least one sidewardly directed nozzle for washing the adjacent wall of said trailer at each side of said washing head.

13. Apparatus as in claim 11 further including bumpers carried by said head at the forward end thereof for cushioning the same from impacts against the trailer walls said bumpers extending beyond the nozzles to prevent contact of the same with the trailer walls.

14. Apparatus as in claim 13 in which said bumpers comprise a resilient wheel mounted for a rotation in a horizontal plane at each side of the forward end of said washing head and projecting laterally and forwardly beyond said head.

15. A method for washing a truck or trailer body interior with an elongate horizontal boom having a washing head at one end and a length adequate to reach to the front of said body interior from the rear thereof and a source of washing fluid under pressure delivered to said head, comprising backing said trailer body in alignment with said boom so that the washing head enters the interior of said body, continuing to back until the head is located proximate the front of said body interior, delivering said pressurized washing fluid to said head, while simultaneously slowly driving said truck or trailer body interior forward and away from said boom so that the washing head is traversed from the front to the rear of said body interior to wash the same.

16. A method as in claim 15 in which said body is a trailer body movable by a yard tractor from an elevatable fifth wheel and includes the step of raising the elevation of the front of said trailer by said fifth wheel to promote gravitational flow of debris and washing fluid to the rear of said trailer as the trailer body is moved forward.

References Cited

UNITED STATES PATENTS

| | | | |
|---|---|---|---|
| 1,073,852 | 9/1913 | Hayes | 239—280.5 |
| 2,857,201 | 10/1958 | Palmer | 239—281 |
| 3,461,889 | 8/1969 | Saxonmeyer | 134—43 |
| 3,534,746 | 10/1970 | Posner | 134—167 R X |

MORRIS O. WOLK, Primary Examiner

D. G. MILLMAN, Assistant Examiner

U.S. Cl. X.R.

134—32, 45, 123, 169 R; 239—280